(12) United States Patent
Suda (10) Patent No.: US 8,330,322 B2
(45) Date of Patent: Dec. 11, 2012

(54) ACTUATOR

(75) Inventor: Sakae Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 12/858,060

(22) Filed: Aug. 17, 2010

(65) Prior Publication Data

US 2011/0049404 A1  Mar. 3, 2011

(30) Foreign Application Priority Data

Aug. 27, 2009 (JP) ................................. 2009-197417
Apr. 8, 2010 (JP) ................................. 2010-089852

(51) Int. Cl.
*H02N 11/00* (2006.01)

(52) U.S. Cl. ...................................................... 310/300

(58) Field of Classification Search .................. 310/300, 310/346, 800
See application file for complete search history.

(56) References Cited

U.S. PATENT DOCUMENTS

| | | | | |
|---|---|---|---|---|
| 4,051,396 A | * | 9/1977 | Berlincourt | .................... 310/339 |
| 4,859,897 A | * | 8/1989 | Massa | ............................ 310/334 |
| 5,268,082 A | * | 12/1993 | Oguro et al. | ................... 204/282 |
| 6,458,483 B1 | * | 10/2002 | Hamano et al. | ................ 429/177 |
| 2001/0006750 A1 | * | 7/2001 | Yoshida et al. | ................ 429/300 |
| 2010/0180865 A1 | * | 7/2010 | Vendulet et al. | .............. 123/472 |

FOREIGN PATENT DOCUMENTS

| | | |
|---|---|---|
| CN | 1833352 A | 9/2006 |
| JP | H08-275564 A | 10/1996 |
| JP | 2006-352947 A | 12/2006 |
| JP | 2008-035682 A | 2/2008 |

* cited by examiner

*Primary Examiner* — Thomas Dougherty (74) *Attorney, Agent, or Firm* — Canon U.S.A., Inc., IP Division (57) ABSTRACT

The present invention provides an actuator which suppresses the inflow of water and the like, and is unlikely to cause cracking and peeling even when repeatedly driven. An actuator having a conductive layer and an ion-conducting layer includes: a first layer which is provided in contact with the actuator and is formed from a polymer that suppresses the permeation of water; and a second layer which is provided in contact with the first layer, has a lower tensile elastic modulus than that of the first layer, protects the first layer, and is formed from a polymer. The first layer and the second layer can cover the whole actuator.

8 Claims, 3 Drawing Sheets

ACTUATOR

BACKGROUND OF THE INVENTION

1. Field of the Invention

The present invention relates to an actuator.

2. Description of the Related Art

A polymer actuator is more flexible than an actuator which is made from a conventional inorganic material, and has drawn attention because of having the feature of operating at a low electric power. Among the polymer actuators, a polymer actuator having a structure in which an ion-exchange resin is sandwiched between two electrodes is typical. This polymer actuator curves and deforms itself by making ions in an ion-exchange membrane migrate due to voltage applied between electrodes. Here, in order to stably retain the ions in the ion-exchange membrane, the actuator is usually covered with a layer (hereinafter sometimes abbreviated as a water-impermeable layer) of a material which suppresses the permeation of water.

For instance, Japanese Patent Application Laid-Open No. 2008-035682 discloses an actuator which suppresses the outflow of the ions from an ion-conductive polymer layer and the inflow of water by covering the surface of a structure including electrodes and the ion-conductive polymer layer (a cation-exchange resin layer) with the water-impermeable layer formed from a polymer. Furthermore, Japanese Patent Application Laid-Open No. 2008-035682 discloses an actuator which not only enhances the performance of suppressing the inflow of water and the like but also has the function of protecting the water-impermeable layer, by forming a metal layer on the surface of the water-impermeable layer.

SUMMARY OF THE INVENTION

However, a problem of the actuator disclosed in Japanese Patent Application Laid-Open No. 2008-035682 is to cause cracking and peeling between a polymer layer functioning as the water-impermeable layer and a metal layer, when repeatedly driven. Another problem of the actuator is that when the metal layer which has generally a higher tensile elastic modulus than the polymer layer is formed on the surface of the polymer layer, the movement of the actuator is disturbed.

The present invention is made in view of such a background art, and an object thereof is to provide an actuator which suppresses the inflow of water and the like and is unlikely to cause cracking and peeling even when repeatedly driven and of which the movement is unlikely to be disturbed.

An actuator having a conductive layer and an ion-conducting layer according to the present invention includes a first layer which is provided in contact with the actuator and is formed from a polymer that suppresses the permeation of water, and a second layer which is provided in contact with the first layer, has a lower tensile elastic modulus than that of the first layer, and is formed from a polymer that protects the first layer.

The present invention can provide an actuator which suppresses the inflow of water and the like and is unlikely to cause cracking and peeling even when repeatedly driven and of which the movement is unlikely to be disturbed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The actuator according to the present embodiment has a conductive layer and an ion-conducting layer. The actuator includes a first layer which is provided in contact with the actuator and is formed from a polymer that suppresses the permeation of water, and a second layer which is provided in contact with the first layer, has a lower tensile elastic modulus than that of the first layer, and is formed from a polymer that protects the first layer.

The actuator according to the present embodiment provides the first layer therein which is formed from the polymer that suppresses the permeation of water, and thereby suppresses the inflow of water and the like. The actuator also has the second layer of the polymer provided in contact with the first layer, thereby protects the first layer which suppresses the permeation of water, and also becomes unlikely to cause cracking and peeling therein even when repeatedly driven. The tensile elastic modulus of the second layer is smaller than that of the first layer, and thus the movement of the actuator becomes unlikely to be disturbed. Here, the first layer which is formed from the polymer that suppresses the permeation of water means the first layer which is a water-blocking layer formed from the polymer.

Figure 1:
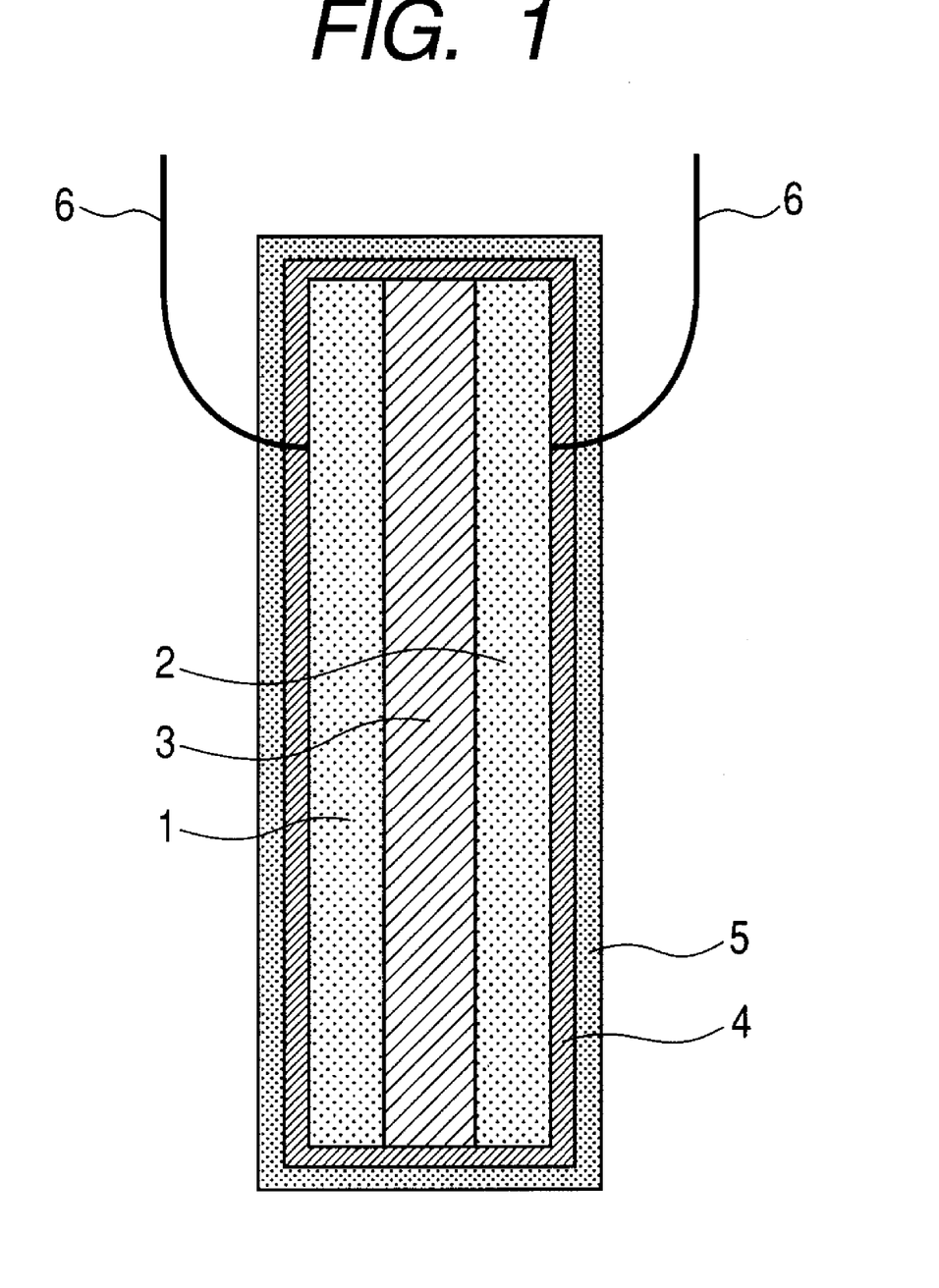
FIG. 1 is a sectional view illustrating an outline of a structure of an actuator according to an embodiment of the present invention.

In the present embodiment, when the above described actuator has a flat shape, the above described second layer can be provided so as to cover both main surfaces of the above described actuator, and can further be provided so as to cover the main surfaces and the side surfaces, as is illustrated in FIG. 1 which will be described later. The above described first layer and the above described second layer can cover the whole actuator.

Figure 2A:
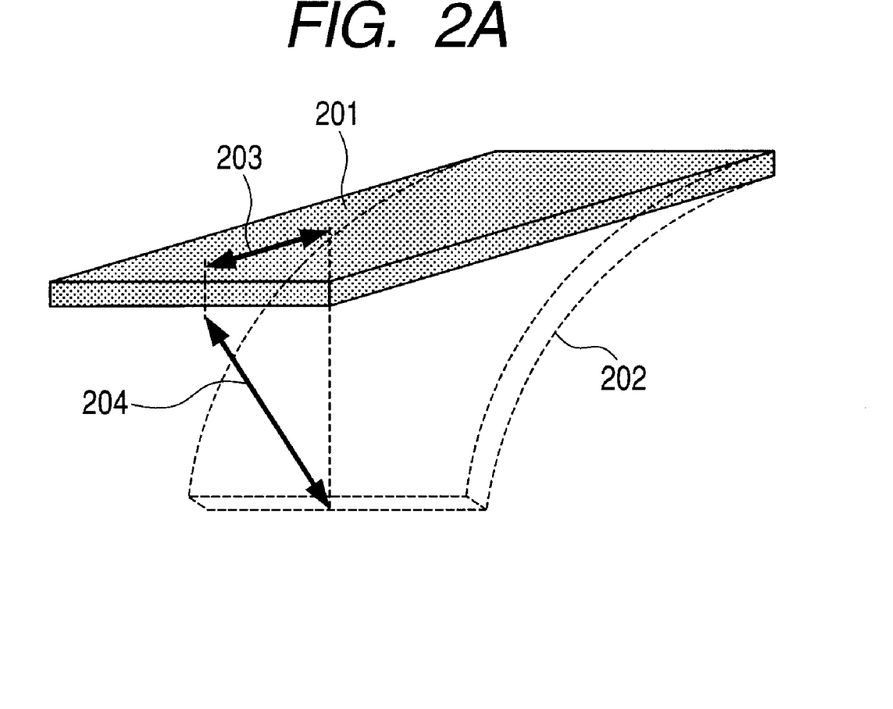
FIGS. 2A and 2B are view illustrating a direction that is a movement direction of a moving actuator, which is projected on the surface.
Figure 2B:
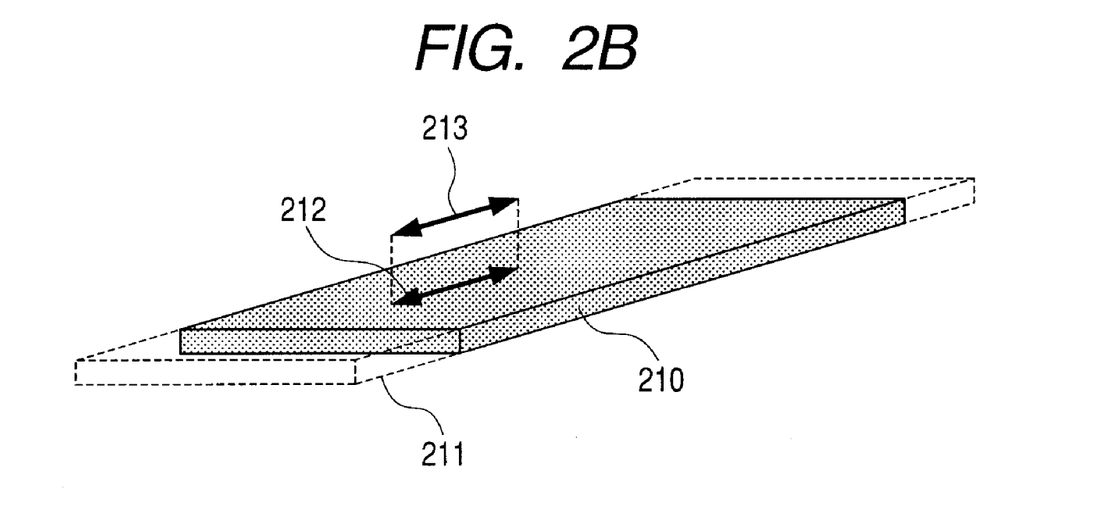

FIG. 1 is a sectional view illustrating an outline of an actuator according to the present embodiment. In FIG. 1, the conductive layer 1 and the conductive layer 2 sandwich the ion-conducting layer 3, and each lead wire 6 is connected to the conductive layer 1 and the conductive layer 2. Furthermore, the whole actuator is covered with the first layer 4 which is provided in contact with the actuator and is formed from the polymer that suppresses the permeation of water, and is further covered with the second layer 5 which is provided on the above described first layer 4 and has a lower tensile elastic modulus than that of the above described first layer 4. FIGS. 2A and 2B illustrate an actuator in which the second layer 5 covers the whole surface.

The actuator according to the present embodiment has the first layer which is formed from the polymer that suppresses the permeation of water.

When a polymer actuator having a structure in which one of the conductive layer and the ion-conducting layer exists on the surface is used in one of water and the air, generally, water molecules existing in the surroundings adsorb onto the surface of the polymer actuator, dissolve in the layer and penetrate into the inner part. When an ion-conductive polymer actuator has an electrolytic solution in its inner part, if the water content varied, the amount of water which migrates along with the migration of the ions when the actuator is driven also receives the influence, and as a result, the ion-conducting polymer actuator is not stably driven. The above ion-conductive polymer actuator is an actuator having a structure including the conductive layer and the ion-conducting layer.

The actuator according to the present embodiment uses the polymer which suppresses the permeation of water as the first layer, so water cannot penetrate the first layer in the ion-conductive actuator which is driven in a water-containing state, and the permeation of the water into the inner part from the outer part of the actuator is suppressed. Furthermore, the actuator can suppress the evaporation and the permeation of water from the inner part of the actuator to the outer part. In the ion-conductive actuator which is driven in the water-containing state, water migrates along with the migration of the ion in the inner part, and the actuator is driven by the expansion of the volume. Therefore, the actuator can be stably driven for a long period of time, and can acquire enhanced durability because of being capable of keeping the water content constant by suppressing the evaporation and the permeation of the water in the inner part to the outer part.

In the present embodiment, the actuator can contain an ionic liquid. The ionic liquid may decompose/deteriorate when used in an environment in which water exists for a long period of time, or degrade the actuator itself when one of $BF_4^-$, $PF_6^-$ and the like is used as an anion, by causing a hydrolysis equilibrium reaction to generate $H^+$. Because of this, if the water in the outer part permeates into the actuator and the actuator is used in the water-containing state for a long period of time, the actuator occasionally is not stably driven. In the present embodiment, a film of a polymer, which suppresses the permeation of water, is used as a first layer, and thus the water cannot penetrate the first layer and the permeation of the water to the inner part from the outer part of the actuator is suppressed. As a result, the generation of $H^+$ due to one of the decomposition/deterioration of the ionic liquid and the hydrolysis equilibrium reaction is suppressed, the actuator can be stably driven in water and the air, for a long period of time, and an actuator having enhanced durability can be obtained.

The actuator according to the present embodiment can suppress the permeation of the ionic liquid existing in the inner part to the outer part, and can keep the amount of the ionic liquid constant. The drive principle of the actuator with the use of the ionic liquid is that cations/anions in the ionic liquid migrate toward respective electrodes when voltage has been applied between the electrodes. Because of this, if the amount of the ionic liquid varies, the actuator occasionally cannot be stably driven. The first layer of a polymer which suppresses the permeation of water in the present embodiment also suppresses the permeation of the ionic liquid, and accordingly can provide an actuator which can keep the amount of the ionic liquid contained in the layer constant, can be stably driven for a long period of time, and has enhanced durability.

Generally, water molecules are unlikely to permeate a site in which a polymer chain is oriented/crystallized in a polymer film, and thus as the ratio of the orientation/the crystallization is larger, the permeability of water with respect to the polymer film is suppressed. In a stretched polymer film and a polymer film in which the polymer chain is oriented/crystallized, the permeability of water is further suppressed compared to that in an untreated polymer film, and as a result, an actuator having enhanced durability can be obtained.

A first layer which suppresses the permeation of water is formed from a polymer having bendability/expansion and contraction properties. A layer of a metal such as aluminum can also suppress the permeation of water, but is easily peeled by a movement such as bending/expansion and contraction. When a flexible polymer is employed for the first layer, the actuator can suppress the peeling of the first layer even though having repeated the movement of bending/expansion and contraction and the like.

The first layer which is used for the actuator according to the present embodiment, is formed from a polymer and suppresses the permeation of water may be any layer as long as the layer can suppress the permeation of a liquid such as water and the ionic liquid, and is not limited in particular. Examples of the polymer include polyethylene such as low-density polyethylene and high-density polyethylene; polypropylene; polyolefin including a polyethylene-polypropylene copolymer; polyvinyl chloride; polyvinylidene chloride; a copolymer of polyvinylidene chloride with polyvinyl chloride, methacrylic acid or the like; polyacrylonitrile; a fluorine resin; a copolymer of each polymer thereof; and a polymer prepared by one of alloying each polymer thereof and blending each polymer thereof. Furthermore, in order to further suppress the permeation of water, one of materials can be also used in which each polymer chain has been stretched, in which each polymer chain has been oriented, and in which each polymer chain has been crystallized. Examples of such a polymer include oriented polyethylene, oriented polypropylene, oriented nylon (oriented polyamide) and oriented polyester, but the polymer is not limited to these polymers. The stretching may be conducted, for instance, by any of uniaxial stretching and biaxial stretching.

A method for stretching, orienting, crystallizing the polymer chain is not limited in particular as long as the polymer chain is stretched, oriented and crystallized. Examples of the method include a method for stretching the polymer uniaxially or biaxially by a stretching machine or the like at a temperature not higher than a melting point, and generally at a temperature not lower than a glass transition temperature; a tenter method; a roll method; a tubular simultaneous biaxial-stretching method; and a combined method thereof. In the case of the biaxial-stretching method, the polymer may be oriented in two directions simultaneously, and may be oriented sequentially. Alternatively, the polymer may be stretched and oriented through multiple stages not fewer than two stages.

The tensile elastic modulus of the first layer formed from the polymer is not less than 0.01 GPa and not more than 10 GPa, and can be not less than 0.05 GPa and not more than 8 GPa.

The thickness of the first layer in the actuator according to the present embodiment is not limited in particular, but is not less than 0.001 μm and not more than 500 μm, and can be not less than 0.1 μm and not more than 200 μm. If the thickness is less than 0.1 μm, the permeation of water cannot be sufficiently suppressed occasionally. If the thickness is more than 500 μm, the movement of the actuator is occasionally disturbed when the actuator is driven.

A second layer which is used for the actuator according to the present embodiment can be formed from a polymer which has a lower tensile elastic modulus than that of the first layer. The second layer is stacked on the above described first layer.

The first layer of the polymer, which is used for the actuator according to the present embodiment, has impermeability with respect to the water, as was described above. Generally, water is difficult to permeate a site at which the polymer chain is oriented/crystallized. Accordingly, the water-impermeable material of a polymer can suppress the permeability of water by having the site at which the polymer chain is oriented/crystallized. However, the site at which the polymer is oriented/crystallized is easily torn in a direction perpendicular to the orientation direction, and easily causes deterioration such as a pinhole when a force of expansion and contraction, bending and the like due to the driving of the actuator is loaded thereon. Furthermore, because the site at which the polymer is oriented/crystallized is hard, the force is more locally loaded on the site when the polymer film is deformed, and as a result, the polymer is easily torn and easily causes deterioration such as a pinhole.

In the present embodiment, the second layer which has a lower tensile elastic modulus than that of the first layer is stacked on the first layer, so the force exerted on the first layer, which is caused by the movement such as bending/expansion and contraction of the actuator, is dispersed and is difficult to be locally loaded. Accordingly, the second layer can suppress the crack/the pinhole occurring between the polymer chains at the site at which the polymer is oriented/crystallized.

The actuator according to the present embodiment is used for a device of a driving system, and accordingly often comes into contact with other parts of the device. For instance, when the first layer of a polymer exists as the top surface of the actuator, a crack/pinhole easily occurs between the polymer chains due to friction and the like, as was described above. In the present embodiment, because the second layer which has a lower tensile elastic modulus than that of the first layer exists on the surface of the actuator, the friction originating from the outer part does not directly occur in the first layer.

The second layer in the actuator according to the present embodiment can be formed from a polymer which has a lower tensile elastic modulus than that of the first layer. The tensile elastic modulus of the second layer is not limited in particular, but can be not more than 5 GPa, and can further be not less than 0.01 GPa and not more than 3 GPa. When the second layer has a tensile elastic modulus more than 5 GPa, the second layer suppresses the movement of the actuator, and the actuator cannot obtain sufficient deformation and/or a sufficient force.

The tensile elastic modulus is expressed by the value (Young's modulus) of a gradient $\delta/\delta$, which is calculated from a stress ($\delta$)-strain ($\epsilon$) curve that has been measured by using a tensile tester, for instance.

The above described second layer can have adhesiveness to the first layer of the polymer. In the present embodiment, the second layer has the adhesiveness to the first layer of the polymer, thereby protects the first layer without being peeled from the first layer even when the actuator is driven for a long period of time, and can suppress the permeation of water. The adhesiveness means that when the second layer has been stacked on the first layer and then a movement such as bending/expansion and contraction has been repeated, peeling does not occur between the layers.

The above described second layer may have a lower tensile elastic modulus than that of the above described first layer and can have the adhesiveness to the first layer. Then, the second layer is not limited in particular. Examples of the material include a polyamide such as nylon 6, nylon 66, nylon 610 and copolymerized nylon; polyurethane; polyvinyl alcohol and a copolymer thereof; silicone rubber; natural rubber; a styrene-butadiene copolymer; a polymer such as an elastomer of polybutadiene and the like; a copolymer of each polymer thereof; and a polymer obtained from one of alloying each polymer thereof and blending each polymer thereof.

The thickness of the above described second layer is not limited in particular, but can be not less than 0.001 µm and not more than 500 µm, and can further be not less than 0.01 µm and not more than 200 µm. When the thickness is less than 0.001 µm, a crack and the like occur due to the movement of the actuator, and the second layer cannot sufficiently protect the first layer occasionally. When the thickness is more than 500 µm, the movement of the actuator is occasionally disturbed.

In the present embodiment, the above described first layer and the above described second layer can cover the whole of the above described actuator. Here, the meaning of covering the whole actuator is that all surfaces of the stacked body including the conductive layer and the ion-conducting layer are covered with the above described first layer and the above described second layer. In the case of the actuator as illustrated in FIG. 1, in the upper and lower sides of the stacked surface formed of stacked each layer of the conductive layer and the ion-conducting layer, the ion-conducting layer appears on the surface layer side, and accordingly water easily permeates therefrom. The actuator can be stably driven and can acquire enhanced durability by covering the whole surface including the stacked surface with the first layer and the second layer, because the layers can thereby block a site through which water can flow into and out from the actuator.

The polymer of the above described first layer can be oriented, and the orientation direction of the above described polymer can be the same direction as the movement direction of the actuator, which is projected on the surface of the first layer. FIG. 2A is a view illustrating a direction that is a movement direction of a bending-moving actuator, which is projected on the surface. FIG. 2B is a view illustrating a direction that is a movement direction of an expansion and contraction-moving actuator, which is projected on the surface.

Here, the direction that is the movement direction of the above described actuator, which is projected on the surface of the first layer, means a direction 203, for instance, as is illustrated in FIG. 2A. In the actuator 201 of FIG. 2A, two conductive layers sandwich the ion-conducting layer, as is illustrated in FIG. 1. When voltage is applied between two conductive layers, the actuator bending-moves in such a way as a dashed line 202, which will be described later. Therefore, the direction that is the movement direction 204 of the actuator, which is projected on the first layer, is the direction 203, and the polymer of the first layer is oriented in the direction 203. At least one direction among the orientation directions of the polymers in the first layer may be the same direction as the movement direction of the actuator, which is projected on the surface of the first layer. For instance, when the polymers are oriented in biaxial directions, either one direction is the same direction as the movement direction of the actuator, which is projected on the surface of the first layer.

The orientation direction of the polymer of the above described first layer is the same direction as the movement direction of the above described actuator, which is projected on the surface of the first layer, which can thereby suppress the tearing of the film in a direction perpendicular to the orientation direction of the polymer. For instance, when the actuator bending-moves in the direction 204 in FIG. 2A, the first layer is elongated in the direction 203 that is the movement direction which is projected on the surface of the first layer. Cracking becomes less likely to occur between the oriented polymer chains by aligning the orientation directions of the polymers to the same direction as the direction 203, because the orientation direction has a higher fracture strength than those in the other directions.

FIG. 2A illustrates the case of a bending movement, but the movement direction is not limited in particular. In the expansion and contraction-moving actuator 210 as illustrated in FIG. 2B, the orientation direction of the polymer is the same as in the case of the bending movement. Specifically, when the actuator elongation-moves in a direction 211, the first layer is expanded and contracted in a direction 212 that is a movement direction 213 which is projected on the surface of the first layer. Cracking becomes less likely to occur between the oriented polymer chains by aligning the orientation directions of the polymers to the same direction as the direction 212, because the orientation direction has a higher fracture strength than those in the other directions.

In the present embodiment, the above described first layer includes at least two layers, and the layers can be stacked so that orientation directions of the polymers of the above described first layer including the at least two layers are different from each other. As was described above, it is generally difficult that water permeates a region in which the polymer chains have been oriented/crystallized. On the other hand, the mechanical strength is strong in the orientation direction, but the layer is easily torn in a direction perpendicular to the orientation direction. Accordingly, a crack/pinhole easily occurs in the direction. In the present embodiment, the layers are stacked so that the orientation directions of the polymers in the above described first layer including at least two layers are different from each other, thereby directions having the strong mechanical strength are not each the same direction but become a plurality of directions. Therefore, the present invention can provide the actuator which has enhanced durability with respect to forces exerted in various directions by the movement. In addition, as the angle formed by the orientation directions of the polymers of at least two layers is larger, the durability with respect to the forces exerted in various directions by the movement is enhanced.

The orientation directions of the polymers in the first layer including at least two layers are not limited in particular as long as the layers are stacked so that the orientation directions of the polymers are different from each other, but an angle formed by the orientation directions of the respective polymers of at least two layers can be not less than 1 degree, and can further be not less than 5 degrees. If the angle is less than 1 degree, the durability with respect to the forces exerted in various directions by the movement is not sufficiently enhanced occasionally.

Figure 3A:
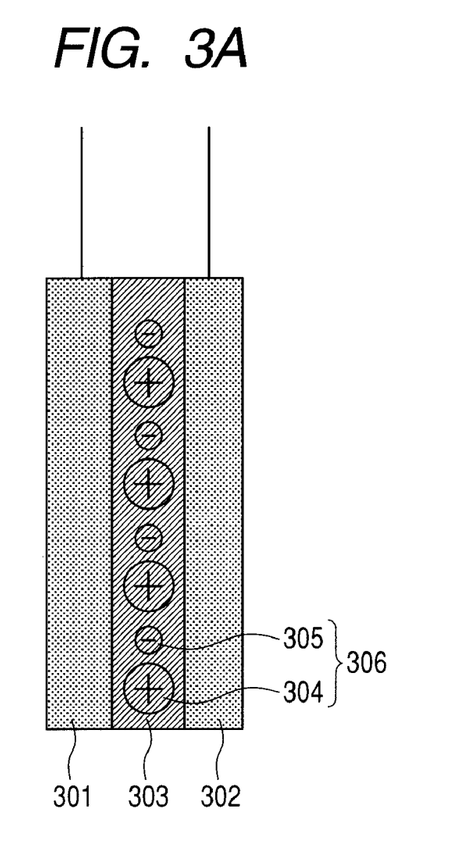
FIGS. 3A and 3B are view illustrating a drive principle of an actuator which is formed by sandwiching an ion-conducting layer between two conductive layers.
Figure 3B:
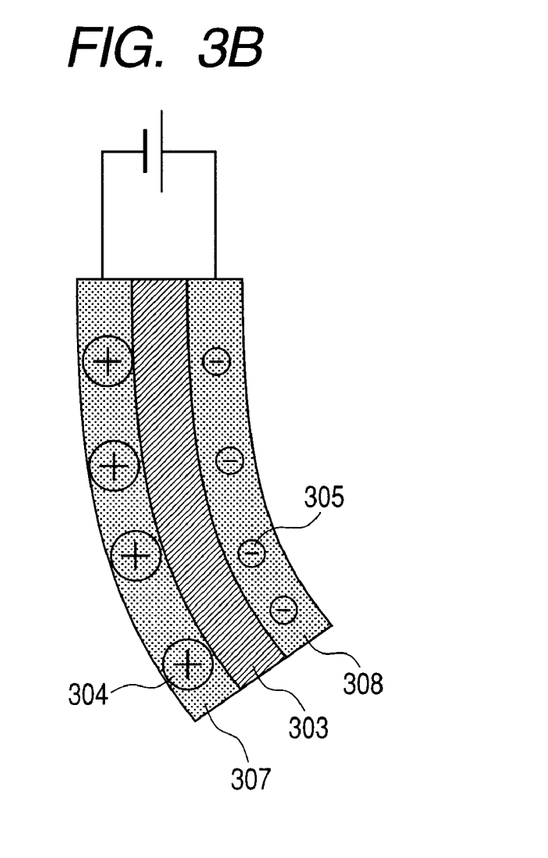

In the present embodiment, the drive principle of the actuator having the conductive layer and the ion-conducting layer is not clear, but a principle which is currently assumed will be described below on an example that can be used in the present embodiment, in which the two conductive layers sandwich the ion-conducting layer, with reference to FIGS. 3A and 3B. As is illustrated in FIG. 3A, the two conductive layers 301 and 302 are formed on surfaces of the ion-conducting layer 303 in a state of being mutually insulated. When a potential difference is applied between these conductive layers 301 and 302, as is illustrated in FIG. 3B, in the cations 304 and anions 305 of an ionic material 306, cations 304 migrate/penetrate into a conductive layer 307 of a cathode, and the anions 305 migrate/penetrate into a conductive layer 308 of an anode. Then, an electric double layer is formed in the interfaces between respective conductive material layers in the conductive layers 307 and 308 and an ionic material phase. The ion radius of the cation 304 in the ionic liquid which can be used is larger than that of the anion 305. It is considered that the conductive layer 307 consequently further expands compared to the conductive layer 308 due to a cooperative action of a steric effect of the ions existing in the conductive layers and an electrostatic repulsion originating in the electric double layer, and that the actuator bends in a direction in which the cathode further extends compared to the anode. The direction of bending deformation, the displacement magnitude, the displacement speed and the like vary depending on types of the conductive layer/ion-conducting layer, a composition/constitution of the electrode, types of migrating ions and the like. When the polarity of the potential is reversed, the film usually bends and deforms to an opposite direction.

The actuator according to the present embodiment has a first layer which is formed from a polymer that suppresses the permeation of water, and a second layer which has a lower tensile elastic modulus than that of the above described first layer, as is illustrated in FIG. 1, but the drive principle is the same as in the above described example. The drive movement is not disturbed by the first layer and the second layer, and the actuator can sufficiently obtain displacement and force.

In the present embodiment, the above described actuator can have an ionic material. Examples of the usable ionic material include lithium fluoride, lithium bromide, sodium bromide, magnesium chloride, copper sulfate, sodium acetate, sodium oleate and sodium acetate, but an ionic liquid is further advantageous.

The ionic liquid (ionic liquid) which is used in the actuator according to the present embodiment is also referred to as one of an ordinary-temperature molten salt and a molten salt that is simple, and means a salt which shows a molten state in a wide temperature region including ordinary temperature (room temperature). Because the ionic liquid shows nonvolatility at ordinary temperature, when the ionic liquid is used as an ion-conducting material in the present invention, the actuator can be driven in the air of which the humidity is not high and in the vacuum.

In the present embodiment, various conventionally-known ionic liquids can be used, but the ionic liquid can show a liquid state at ordinary temperature (room temperature) or at a temperature close to ordinary temperature as much as possible and be stable. In the present invention, the ionic liquid can be an ordinary-temperature molten salt, and can have electroconductivity not less than $0.1\ Sm^{-1}$.

Compounds formed of any of cations expressed by the following general formulae (1) to (4) (which can be an imidazolium ion) and an anion ($X^-$) can be illustrated as the ionic liquid which can be used in the present embodiment.

[Formula 1]

(1)

(2)

$[NRxH4-x]^+$
(3)

$[PRxH4-x]^+$
(4)

In the above described formulae (1) to (4), R represents one of an alkyl group having 1 to 12 carbon atoms and an alkyl group which contains an ether bond and has 3 to 12 carbon atoms and oxygen atoms in the total number; and in formula (1), R1 represents one of an alkyl group having 1 to 4 carbon atoms and a hydrogen atom. In formula (1), R and R1 cannot be the same. In each of formulae (3) and (4), x is an integer of 1 to 4.

As the anion ($X^-$), at least one selected from a tetrafluoroborate anion, a hexafluorophosphate anion, a bis (trifluoromethane sulfonyl) imidate anion, a perchlorate anion, a tris (trifluoromethane sulfonyl) carbonate anion, a trifluoromethane sulfonate anion, a dicyanamidate anion, a trifluoroacetate anion, an organic carboxylate anion and a halogen ion can be used advantageously.

In the conductive layer which is used in the actuator according to the present embodiment, a conductive material may show electroconductivity so that the ion penetrates/migrates into the conductive layer when voltage is applied between two conductive layers, and examples thereof include a carbon material, a conductive polymer, a metal and a metal compound. These conductive materials may be used solely and may also be used in combination of one or more thereof.

In particular, the above described conductive material can be a carbon material or a conductive polymer from the viewpoint of an interaction with the ionic material. When the conductive material shows a high interaction with the ionic material, the conductive material can be adequately and uniformly dispersed in the conductive layer, and can increase the mechanical strength of the obtained conductive layer.

The above described conductive layer can contain the carbon material. Examples of the carbon material include a carbon nanotube, carbon black, fullerene, graphite and a carbon fiber, but is not limited to these materials. The carbon material may be used solely and also in combination of one or more thereof. For information, a carbon nanotube (Carbon nanotube) is occasionally abbreviated as a CNT.

The conductive material of the actuator according to the present embodiment can be the CNT because a layer having electroconductivity and expansion and contraction properties can be obtained. A conductive gel having expansion and contraction properties can be obtained by shearing and dispersing the CNT together with the ionic liquid. The CNT is a carbon-based material having such a shape that a graphene sheet is wound into a cylindrical shape, and is roughly classified into a single-walled carbon nanotube (SWNT) and a multi-walled carbon nanotube (MWNT) from the number of layers constituting the circumferential wall. The CNT is also classified into various types such as a chiral (spiral) type, a zigzag type and an armchair type from difference among the structures of the graphene sheet, which are well-known. In the present embodiment, any type of CNT can be used as long as the CNT is referred to as a so-called CNT. Generally, a single-walled carbon nanotube which has a higher aspect ratio, in other words, which is thin and long, tends to easily form the gel. Accordingly, in the present embodiment, a gel composition can be obtained from the SWNT. Examples of a practically available CNT include HiPco (made by Carbon Nanotechnologies Inc.) which employs carbon monoxide as a raw material and can be comparatively mass-produced, but are not limited to HiPco, of course.

The above described usable conductive materials include a conductive polymer having electroconductivity, but the conductive polymer is not limited in particular. Examples of the conductive polymer include a π-conjugated conductive polymer such as polyacetylene, polyaniline, polypyrrole, polythiophene, polyparaphenylene, polyphenylene vinylene and polyazulene, and derivatives of these π-conjugated conductive polymers. These conductive polymers may be used solely or in combination of one or more thereof.

The above described conductive layer can contain the conductive material and the ionic liquid. In addition, in order to keep a mechanical strength of the conductive layer, the conductive layer may contain a polymer in addition to the CNT and the ionic liquid.

The weight percentage of the above described conductive material in the above described conductive layer with respect to the conductive layer can be not less than 1 wt %. When the content is less than 1 wt %, the conductive layer does not provide sufficient electroconductivity occasionally.

The content of the conductive polymer in the above described conductive layer can be not more than 99 wt %. When the content is more than 99 wt %, the conductive layer does not provide sufficient electroconductivity occasionally.

The content of the ionic liquid in the above described conductive layer can be not more than 80 wt %. When the content is more than 80 wt %, the conductive layer occasionally shows a weak mechanical strength.

In the actuator according to the present embodiment, a polymer binder which can be used for obtaining the conductive layer is not limited in particular as long as the polymer binder has such flexibility as to be capable of deforming while complying with the bending deformation of the above described actuator. The polymer binder according to the present embodiment can have little hydrolyzability and can be stable in the air. Examples of such a polymer binder include a polyolefin-based polymer such as polyethylene and polypropylene; polystyrene; polyimide; polyparaphenylene oxide; polyarylenes (aromatic-based polymer) such as poly (2,6-dimethylphenylene oxide) and polyparaphenylene sulfide; a compound in which a sulfonic group ($-SO_3H$), a carboxyl group ($-COOH$), a phosphate group, a sulfonium group, an ammonium group, a pyridinium group and the like are introduced into a polyolefin-based polymer, polystyrene, polyimide, polyarylenes (aromatic-based polymer) and the like; a fluorine-containing polymer such as polytetrafluoroethylene and polyvinylidene fluoride; a perfluoro-sulfonate polymer, a perfluoro-carboxylate polymer, a perfluoro-phosphate polymer and the like in which a sulfonic group, a carboxyl group, a phosphate group, a sulfonium group, an ammonium group, a pyridinium group and the like are introduced into a skeleton of the fluorine-containing polymer; a polybutadiene-based compound; a polyurethane-based compound such as an elastomer and a gel; a silicone-based compound; polyvinyl chloride; polyethylene terephthalate; nylon; and a polyarylate. In addition, a polymer binder having electroconductivity can be used. Such a polymer binder is not limited in particular, and examples thereof include polyaniline, polypyrrole, polythiophene, polyacetylene and polyphenylene. For information, these polymer binders may be used solely or in combination of one or more thereof. The polymer binders may be also functionalized, and may be a copolymer with other polymers.

Among these polymer binders, examples of the polymer binders which can be particularly used include a polyvinylidene fluoride-hexafluoropropylene copolymer [PVDF (HFP)], polyvinylidene fluoride (PVDF), perfluoro-sulfonate (Nafion), 2-hydroxyethyl methacrylate (HEMA), polymethylmethacrylate (PMMA), polyethylene oxide (PEO) and polyacrylonitrile (PAN). In addition, the above described polymer binder can be a polymer which is highly compatible with the ion-conducting layer. Thereby, the polymer binder has higher compatibility and bondability with the ion-conducting layer, thereby can constitute a tighter electrode. For this purpose, the above described polymer binder can be one of a polymer which has a polymer structure of the same type as, a similar to or the same as the polymer compound which composes the above described ion-conducting layer, and a polymer binder which has a functional group of the same type as, a similar to or the same as the polymer compound.

Furthermore, as the above described polymer binder, a metal oxide which has a polymer structure obtained through one of a sol-gel process and the like can also be used. Such a metal oxide is not limited in particular, and for instance, metal oxides based on manganese, nickel and cobalt, and vanadium pentoxide can be used.

An electric resistance value of the above described conductive layer of the actuator according to the embodiment can be not more than 1,000 Ωcm, and can further be not more than 100 Ωcm. By setting the electric resistance value of the above described electrode at value not more than 1,000 Ωcm, the actuator of the present invention can be bent when a low voltage is applied to the electrodes. The above described electrode may contain the polymer binder and other components of the above described conductive material, unless the composition gives unfavorable influence on the function of a soft actuator.

The conductive layer of the actuator according to the present embodiment can have at least one of a polymer fiber and a porous component.

The polymer fiber and the porous component contained in the conductive layer of the present embodiment have the above described polymer binder.

When the conductive layer contains the polymer fiber, the conductive layer contains many voids. As a result, the ionic liquid can easily go into the conductive layer or can easily go out of the layer. Therefore, when the voltage is applied between the conductive layers, the conductive layer can contain the ionic liquid even in a deep part or can contain a large amount of the ionic liquid, and the actuator deforms in a larger displacement magnitude. Furthermore, the conductive layer can have the conductive material because the conductive material enhances the electroconductivity of an electrode layer. The actuator of the present embodiment has the above described first layer provided in contact with the actuator, and accordingly can suppress the leaving of the ionic liquid from the conductive layer into which the ionic liquid can easily permeate. The actuator can also suppress the entry of water and the like into the conductive layer from the outer part. Furthermore, the actuator has the above described second layer provided on the above described first layer, and accordingly is unlikely to cause cracking and peeling therein, even when repeatedly driven. Therefore, the actuator can be obtained which can keep the amount of the ionic liquid contained in the inner part of the actuator constant, and can be stably driven for a long period of time.

The above described polymer fiber has sufficient length with respect to a diameter of the fiber. Here, the diameter of the fiber is not less than 0.05 μm and not more than 50 μm and the length is not less than 10 times of the diameter of the fiber.

The polymer fiber according to the present embodiment may be in a random state in the conductive layer, and may be also arranged so as to be aligned in a certain direction. When the actuator has a long shape and a lead wire is provided on the end in the longitudinal direction, for instance, the polymer fiber can be provided along the longitudinal direction. This is because the difference between the voltage in the part in contact with the lead wire and the voltage on the other end in the longitudinal direction, on which the lead wire is not provided, becomes small.

Alternatively, the polymer fiber may be arranged so as to be aligned also in a direction which intersects the longitudinal direction. In that case, the actuator tends to easily deform.

The holes of the porous component according to the present embodiment include any of closed cells and connected holes which are connecting with each other. The hole can further be the connecting hole because the cations and the anions easily migrate and diffuse therethrough. The connecting hole and the closed cells may also exist together.

The porosity of the porous component can be not less than 5 vol % and not more than 90 vol %. When the porosity is less than 5 vol %, the migration of the ionic liquid is occasionally suppressed. When the porosity is more than 90 vol %, the conductive layer does not show a sufficient mechanical strength, which occasionally causes cracking and the like during deformation. Here, the porosity can be measured with any of a mercury intrusion porosimetry, a gas absorption method, an Archimedes method and the like.

The size of the hole can be not less than 0.005 μm and not more than 3 mm. When the size of the hole is less than 0.005 μm, the migration of the ionic liquid is occasionally suppressed. When the size of the hole is more than 3 mm, the stress in the inner part is more applied to the large hole when the actuator bends, which occasionally causes cracking and the like. The size of the hole can be measured with any of the mercury intrusion porosimetry, the gas absorption method and direct observation by one of a scanning electron microscope and the like.

The above described conductive layer may have any one of the polymer fiber and the porous component, and may also have both of them.

The ion-conducting layer of the actuator according to the present embodiment contains the ionic liquid, and can contain the polymer because the polymer retains the ionic liquid and secures the mechanical strength and the flexibility.

The content of the ionic liquid can be not less than 30 wt % and not more than 80 wt % with respect to the ion-conducting layer. If the content of the ionic liquid/ionic material is less than 30 wt %, the ionic material may not be sufficiently supplied to the conductive layer when voltage has been applied. When the content of the ionic liquid/ionic material is larger than 80 wt %, the mechanical strength of the ion-conducting layer becomes weak and a sufficient action force may not be obtained, when the actuator bends/deforms.

In the present embodiment, examples of a polymer which can be used for providing the ion-conducting layer include a fluorine-containing polymer such as tetrafluoroethylene and polyvinylidene fluoride; a polyolefin-based polymer such as polyethylene and polypropylene; a polybutadiene-based compound; polyurethane-based compound such as an elastomer and a gel; a silicone-based compound; thermoplastic polystyrene; polyvinyl chloride; and polyethylene terephthalate. For information, these polymers may be used solely or in combination of one or more thereof. The polymers may be also functionalized, and may be a copolymer with other polymers. The above described polymer needs to contain the ionic material. Thereby, when the voltage is applied, the actuator formed of the above described non-ionic polymer compound can bend and deform.

In the present embodiment, when the ionic material is the ionic liquid, examples of the polymer include a polyvinylidene fluoride-hexafluoropropylene copolymer [PVDF (HFP)], polyvinylidene fluoride (PVDF), perfluoro-sulfonate (Nafion), 2-hydroxyethyl methacrylate (HEMA), polymethylmethacrylate (PMMA), polyethylene oxide (PEO) and polyacrylonitrile (PAN), but the polymer is not limited in particular. These polymers may be used solely or in combination of one or more thereof. The polymer which is used for the conductive layer and the polymer which is used for the ion-conducting layer may be the same and may be also different from each other.

The above described ion-conducting layer of the actuator according to the present embodiment can have at least one of the polymer fiber and the porous component. The polymer fiber which constitutes the ion-conducting layer of the present embodiment has the above described polymer binder. The ion-conducting layer has many voids because of having a structure in which the polymer fibers gather, and as a result, the ionic liquid can easily migrate into the ion-conducting layer. Therefore, when the voltage is applied between the conductive layers, the ionic liquid can easily pass the ion-conducting layer, migrate and penetrate into the conductive layers. Then, the actuator can be quickly driven. The actuator of the present embodiment is wholly covered with the above described first layer and accordingly can suppress the egression of the ionic liquid to the outer part from one of the electrode layer and the ion-conducting layer in which the ionic liquid easily permeates. Furthermore, the above described second layer covers the whole surface of the above described first layer, thereby the actuator is unlikely to cause cracking and peeling therein even when repeatedly driven. Therefore, an actuator can be obtained which can keep the amount of the ionic liquid in the inner part of the actuator constant, and can be stably driven for a long period of time. The above described polymer fiber has a sufficient length with respect to the fiber diameter. Here, the fiber diameter is not less than 0.05 µm and not more than 50 µm, and the length is more than 10 times of the fiber diameter.

The polymer fiber according to the present embodiment may be in a random state in the ion-conducting layer, and may be arranged so as to be aligned in a certain direction. The actuator can have a rectangle surface shape and the lead wire can be provided on the end in the longitudinal direction, because the actuator has adequate durability, for instance, with respect to the deformation of the polymer as illustrated in FIG. 2A.

Alternatively, the polymer fiber may be arranged so as to be aligned also in a direction which intersects the longitudinal direction. In that case, the actuator tends to easily deform.

The porous component contained in the ion-conducting layer of the present embodiment has the above described polymer binder. The ion-conducting layer has many voids because of being the porous component, and as a result, the ionic liquid can easily migrate into the ion-conducting layer. Therefore, when voltage is applied between the conductive layers, the ionic liquid can easily pass the ion-conducting layer and migrate into and penetrate into the conductive layer. Then, the actuator can be quickly driven. The actuator of the present embodiment is wholly covered with the above described first layer and accordingly can suppress the egression of the ionic liquid to the outer part from one of the electrode layer and the ion-conducting layer in which the ionic liquid easily permeates. Furthermore, the above described second layer covers the whole surface of the above described first layer, and accordingly, the actuator is unlikely to cause cracking and peeling therein even when repeatedly driven. Therefore, an actuator can be obtained which can keep the amount of the ionic liquid in the inner part of the actuator constant, and can be stably driven for a long period of time.

The holes of the porous component include any of closed cells and connected holes which are connecting with each other. The hole can further be the connected hole because the cations and the anions easily migrate and diffuse therethrough. The connected hole and the closed cells may also exist together.

The porosity of the porous component can be not less than 5 vol % and not more than 90 vol %. When the porosity is less than 5 vol %, the migration of the ionic liquid is occasionally suppressed. When the porosity is more than 90 vol %, the ion-conducting layer does not show a sufficient mechanical strength, which occasionally causes cracking and the like during deformation. Here, the porosity can be measured with any of a mercury intrusion porosimetry, a gas absorption method, an Archimedes method and the like.

The size of the hole can be not less than 0.005 µm and not more than 3 mm. When the size of the hole is less than 0.005 µm the migration of the ionic liquid is occasionally suppressed. When the size of the hole is more than 3 mm, the stress in the inner part is more applied to the large hole when the actuator bends, which occasionally causes cracking and the like. The size of the hole can be measured with any of the mercury intrusion porosimetry, the gas absorption method, and direct observation by one of a scanning electron microscope and the like.

The above described ion-conducting layer of the actuator according to the present embodiment may have any one of the polymer fiber and the porous component, and may also have both of them.

The above described conductive layer can contain an ionic liquid and a conductive material. In order to keep the mechanical strength of the conductive layer, the conductive layer may contain a polymer in addition to a carbon material and the ionic liquid.

A method for manufacturing the above described conductive layer is not limited in particular as long as the conductive material is dispersed/retained in the conductive layer, but examples thereof include a method of subdividing the conductive material while adding a shearing operation to the conductive material in the presence of one of the ionic liquid and the polymer as needed to form a dispersion of the conductive material, forming films from the dispersion and stacking the films.

A unit of imparting a shearing force to the conductive material in this subdivision step is not limited in particular, and may be a unit of mashing the conductive material with one of a manual mortar and an automatic mortar, when the dispersion is manufactured, for instance, in a small scale such as in a laboratory. In addition, when a large-scale manufacture is aimed, a wet crushing equipment such as a ball mill, a roller mill and a vibration mill which can impart a high shearing force to the conductive material can be used. Furthermore, a kneader type of a kneading machine can also be used. In consideration of the viscosity of the dispersion, it is also possible to give the shearing force to the conductive material by adding a solvent to the dispersion to adjust the viscosity moderately. A period of time necessary for subdividing the conductive material is also not limited in particular. The time can be appropriately changed according to degrees of subdivision necessary in applications, but generally is approximately 5 minutes to 1 hour. The dispersion of the conductive material can be provided by the above described processes.

A method of forming a film by using the dispersion of the conductive material and obtaining the conductive layer is not limited in particular, and may be a method of forming a film from the dispersion of the conductive material with one of a casting method, a spin coating method, a printing method, a spraying method and the like, vaporizing the solvent and drying the remaining film. An extrusion process and an injection method also can be used.

The generation mechanism and the structure of a gel composition which includes a CNT and the ionic liquid and can be used for the present embodiment are not yet clear, but the outline can be understood in the following way from various analysis results.

(1) The subdivision treatment under the shearing force does not cause a chemical denaturation of the CNT, but reduces mutual entanglement among the CNTs, and causes such a change of their physical shape that the bundle is thinned down. (2) It is considered that the formation of the gel is not caused by the entanglement among the CNTs. It is supposed that the gel is formed due to a cross linkage structure formed by such an action that the molecule of the ionic liquid which has been bonded to the surface of the CNT of which the entanglement has been reduced through an interaction of "cation-π" combines the bundles of the CNTs with each other through an ionic bond. Here, the cross linkage structure means a three-dimensional network structure.

The thickness of the above described conductive layer is not less than 1 μm and not more than 5 mm, can be not less than 5 μm and not more than 2 mm, and can further be not less than 10 μm and not more than 500 μm. When the film thickness is more than 5 mm, the elastic modulus of the film becomes large, which occasionally suppresses the bending movement of the actuator. When the film thickness is less than 1 μm, the amount of the ionic liquid which migrates/penetrates into the conductive layer is small, and the bending movement cannot be sufficiently obtained occasionally.

The above described ion-conducting layer can have the ionic liquid, and can contain the polymer so as to retain the ionic liquid and keep the mechanical strength of the conductive layer.

A method for manufacturing the above described ion-conducting layer is not limited in particular as long as the ionic liquid is retained in the ion-conducting layer. For instance, a method can be used which dissolves/disperses the ionic liquid and the polymer in a solvent to obtain an ionic composition, forms a film by subjecting the obtained composition to one of the cast method, the spin coating method, the printing method, the spraying method and the like, vaporizes the solvent and dries the remaining film. Alternatively, methods can also be used which include a method of heating and melting polymer, kneading the molten polymer together with an ionic material and forming a film, an extrusion process and an injection method.

The thickness of the above described ion-conducting layer can be not less than 10 μm and not more than 500 μm, and can further be not less than 10 μm and not more than 400 μm. When the film thickness is more than 500 μm, the elastic modulus of the film becomes large, which occasionally suppresses the bending movement of the actuator. In addition, when the film thickness is less than 10 μm, the mass of the ionic liquid which is retained in the ion-conducting layer is little and the amount to be supplied to the conductive layer becomes little. Accordingly, a sufficient drive movement cannot be obtained occasionally.

In the present embodiment, a method of having a first layer and a second layer, and stacking the above described second layer on the above described first layer is not limited in particular. For instance, the method may include firstly producing a stacked body which includes a conductive layer and an ion-conducting layer and is driven when voltage is applied thereto, and stacking the first layer and the second layer sequentially thereon. The method alternatively includes producing the conductive layer, the ion-conducting layer, the first layer and the second layer separately, stacking the layers in an order which is desired to be stacked, and pressurizing and heating and fusion-bonding the layers by one of a hot press and the like to stack the layers. The method also alternatively includes repeating the steps of applying/film-forming/drying the dispersion of the conductive material and an ionic composition which have been obtained through the above described method, sequentially in an order which is desired to be stacked.

Furthermore, in the present embodiment, the above described first layer and the above described second layer can cover the whole actuator, and the production method is not limited in particular as long as the above described first layer and the above described second layer cover the whole actuator. The method includes, for instance, firstly producing a stacked body which includes the conductive layer and the ion-conducting layer and is driven when voltage is applied thereto, dipping the stacked body in a solution of a polymer which is used for the first layer, drying the stacked body, subsequently dipping the stacked body in a solution of a polymer which is used for the second layer, and drying the stacked body. Here, the solution of the polymer may be prepared by dissolving or dispersing the polymer into one of water and a solvent, and may also be prepared by melting the polymer by heat. In the case of the solution of the polymer having been melted with heat, one of the first layer and the second layer can be obtained by returning the temperature of the solution into which the stacked body has been dipped, to room temperature. The first layer and the second layer can also be produced by sandwiching the stacked body between one of the first layers and the second layers instead of dipping the stacked body, pressurizing and heating the stacked body and melting the layers to fusion-bond the layers with the stacked body.

In addition, in the present embodiment, a method of producing an actuator in which the orientation of the polymer of the above described first layer directs the same direction as the movement direction of the above described actuator, which is projected on the surface of the first layer, is not limited in particular. For instance, a stacked body is firstly produced which includes the conductive layer and the ion-conducting layer and is driven when voltage is applied thereto. Subsequently, the first layers are stacked so as to sandwich the above described stacked body and so that the stretched/orientation direction of the oriented film which is the first layer and has been produced separately can be the same as the movement direction of the actuator, which is projected on the surface. Furthermore, another method includes sandwiching the stacked body between the second layers, and then pressure-heating the stacked body to stack the layers thereon. Still another method includes stacking an oriented film so as to sandwich the stacked body between the oriented films instead of sandwiching the stacked body between the second layers, then dipping the stacked body into the solution of the polymer which is used for the second layer, and drying the dipped stacked body.

In addition, in the present embodiment, a method of producing an actuator in which at least two layers are stacked so that the orientation directions of the polymers of the above described first layer having at least two layers are different from each other is not limited in particular. For instance, a stacked body is firstly produced which includes the conductive layer and the ion-conducting layer and is driven when voltage is applied thereto. Subsequently, at least two layers of oriented films which form the first layer and have been produced separately are lapped on the above described stacked body so as to sandwich the above described stacked body and so that the stretched/orientation directions can be different among the films, the stacked body is further sandwiched between the second layers, and the resultant stacked body is pressure-heated to have the layers stacked thereon. Another method includes stacking an oriented film so as to sandwich the stacked body between the oriented films instead of sandwiching the stacked body between the second layers, then dipping the stacked body into the solution of the polymer which is used for the second layer and drying the dipped stacked body.

Solvents to be used when the conductive layer and the ion-conducting layer, and the actuator on which the layers are stacked are produced are not limited in particular as long as the solvents can adequately disperse the conductive material and the ionic material therein. Examples of the solvents include 4-methyl-2-pentanone, N-methyl-2-pyrrolidone, dimethylformamide, N,N-dimethylacetamide and tetrahydrofuran. Solvents to be used when the first layer and the second layer of the polymer, and the actuator on which the layers have been stacked are produced may adequately disperse the polymers therein. For instance, the above described solvents, water, alcohol, toluene, xylene and the like can also be used, but the solvents are not limited in particular. These solvents may be used solely or in combination of one or more thereof.

In the present embodiment, the voltage applied between both conductive layers can be not more than 10 V, can be used in such a range (potential window) as not to decompose the ionic liquid when the voltage has been applied therebetween, and can further be not more than 4 V.

The present invention will be described below in detail with reference to Exemplary Embodiments, but the present invention is not limited to these Exemplary Embodiments.

Exemplary Embodiment 1

The actuator 1 is produced as follows in which a first layer is formed from high-density polyethylene (HDPE), a second layer is formed from polyamide (PA), the second layer exists in the surface side, and the first layer and the second layer cover the whole actuator.

Firstly, a stacked body 1 is produced as follows, in which the two conductive layers sandwich the ion-conducting layer. In order to produce the ion-conducting layer, the ionic composition containing an ionic liquid and a polymer is produced in the following way. An ionic composition 1 containing the transparent ionic liquid and the polymer is obtained by heating and mixing 100 mg of a polyvinylidene fluoride-hexafluoropropylene copolymer (PVdF (HFP)) expressed by the following chemical formula, 100 mg of 1-butyl-3-methyl imidazolium tetrafluoroborate (BMIBF4 made by Kanto Chemical Co., Inc.) and 1 mL of N,N-dimethylacetamide (DMAc made by Kishida Chemical Co., Ltd.), at 80° C.

[Formula 2]

In addition, in order to produce the conductive layer, a dispersion of a conductive material is produced in the following way, in which the conductive materials are uniformly dispersed. An organic solvent DMAc in an amount of 1 mL is added to 10 mg of a single-walled carbon nanotube (SWNT, and "HiPco" made by Carbon Nanotechnologies Inc.) which is a conductive material and 100 mg of BMIBF4 which is an ionic liquid. Then, the materials are dispersed with the use of zirconia balls (with particle diameter of 2 mm) at 200 rpm for 30 minutes by a ball mill (planetary micro mill made by Fritsch GmbH). Subsequently, a solution in which 80 mg of PVdF (HFP) is dissolved in 2 mL of DMAc is added to a composition obtained by the ball mill, and the mixture is further dispersed at 500 rpm for 30 minutes by a ball mill. As a result, the dispersion 1 of the conductive material is obtained, which has high viscosity and has the conductive material dispersed uniformly.

Next, a stacked body is produced as follows in which two conductive layers sandwich the ion-conducting layer. Firstly, the first conductive layer is obtained by pouring the above described dispersion 1 of the conductive material onto a substrate having a spacer with a thickness of 80 μm, flattening the dispersion 1 while using the spacer as a guide, and drying the dispersion at room temperature. Next, the ion-conducting layer is obtained by lapping another spacer with the thickness of 60 micrometers on the obtained conductive layer, pouring the ionic composition 1 which is obtained in the above step and is formed of PVdF(HFP)/BMIBF4/DMAc, onto the conductive layer, flattening the ionic composition while using the spacer as a guide, and drying the ionic composition at room temperature. A stacked body 1 is obtained by stacking further another spacer with the thickness of 80 micrometers on the ion-conducting layer, pouring the dispersion 1 of the conductive material which has been produced in the above description, flattening the dispersion while using the spacer as a guide, drying the dispersion at room temperature, and then drying the dried film in a vacuum overnight.

In addition, an HDPE film with the thickness of 20 μm is obtained by supplying high-density polyethylene (HDPE of HF313 made by Japan polyethylene Co., Ltd.) into an extruder, melting the high-density polyethylene, extruding the melt through a film die, and cooling the extruded film with a molding machine. The obtained HDPE film with the thickness of 20 μm is cut out into a size of a width of 4 mm (W) and a length of 20 mm (L). The above described stacked body 1 is cut out into a size of the width of 1 mm (W) and the length of 12 mm (L), the both faces thereof are sandwiched between the HDPE films, and the stacked body 1 is pressurized and heated and fusion-bonded with a hot press (made by Tester Sangyo Co., Ltd.) at 130° C. and 0.5 kN. After that, the HDPE film protruded from the stacked body 1 is cut out by the width of 1 mm, and the fusion-bonding of the HDPE film in the thickness direction is promoted by the operation of pressing the four faces of the stacked face of the stacked body 1 to a hot plate which has been overheated to 140° C. Next, a hole through which a lead wire passes is formed so as to reach the surface of the conductive layer from the surface of a portion of 2 mm apart from an end, and the lead wire is bonded to the conductive layer with a conductive adhesive. After that, the periphery of the lead wire is heated at 140° C. to melt a part of the HDPE and block the hole of the HDPE. Thereby, the stacked body results in being coated with the first layer. Next, the stacked body is dipped into a solution of toluene (made by Kishida Chemical Co., Ltd.) containing 10 wt % of polyamide (PA of PA-201 made by Fuji Kasei Kogyo Co., Ltd.), and the raised stacked body is dried to have the surface coated with a second layer. The actuator 1 is produced by the above production method, in which the first polymer layer is HDPE, the second layer is PA, and the second layer exists in the surface side and covers the whole actuator.

It can be confirmed that the two conductive layers sandwich the ion-conducting layer, by the observation of the cross section of the obtained actuator 1 with the use of a scanning electron microscope (SEM of S-4800 made by Hitachi High-Technologies Corporation). Furthermore, it can be confirmed that the whole in the surface side thereof is coated with the HDPE, and the whole in the further surface side thereof is coated with the PA.

Exemplary Embodiment 2

An actuator 2 is produced as follows in which the first layer is cast polypropylene (CPP1), the second layer is polyamide (PA), and the second layer exists in the surface side and covers the whole actuator.

The actuator 2 is obtained by using the cast polypropylene (CPP1) instead of the HDPE for the first layer in Exemplary Embodiment 1 and producing the actuator in a similar way to that in Exemplary Embodiment 1 at the same condition except for the first layer.

It can be confirmed that the two conductive layers sandwich the ion-conducting layer, by the observation of the cross section of the obtained actuator 2 with the use of a scanning electron microscope (SEM of S-4800 made by Hitachi High-Technologies Corporation). Furthermore, it can be confirmed that the whole in the surface side thereof is coated with the CPP1, and the whole further in the surface side thereof is coated with the PA.

Exemplary Embodiment 3

An actuator 3 is produced as follows in which the first layer is uniaxially oriented polyethylene (OPE), the second layer existing in the surface side is polyamide (PA), the orientation of the polymer of the OPE of the first layer is the same direction as a movement direction of the actuator, which is projected on the surface of the first layer.

The uniaxially oriented polyethylene (OPE) to be the first layer is obtained as follows. The HDPE film with the thickness of 200 µm is obtained by supplying the HDPE to an extruder, melting the HDPE, extruding the HDPE through a film die, and cooling the HDPE with a molding machine. Subsequently, the uniaxially oriented film OPE with the thickness of 20 µm is obtained by the operation of stretching the HDPE film with the thickness of 200 µm to 10 times with a uniaxial stretching machine (made by Imoto Machinery Co., Ltd.) in the atmosphere at 120° C.

Next, a stacked body 1 obtained in Exemplary Embodiment 1 is cut out into a size of the width of 1 mm (W) and the length of 12 mm (L), and the both faces thereof are sandwiched between the OPE films so that the stretching direction of the OPE matches the longitudinal direction. The stacked body 1 is pressurized and heated and fusion-bonded by a hot press (made by Tester Sangyo Co., Ltd.) at 130° C. and 0.5 kN. The actuator 3 is obtained in similar conditions to those in Exemplary Embodiment 1 except for the above description.

It can be confirmed that the two conductive layers sandwich the ion-conducting layer, by the observation of the cross section of the obtained actuator 3 with the use of a scanning electron microscope (SEM of S-4800 made by Hitachi High-Technologies Corporation). Furthermore, it can be confirmed that the whole in the surface side thereof is coated with the OPE, and the whole further in the surface side thereof is coated with the PA.

Exemplary Embodiment 4

An actuator 4 is produced as follows in which the first layer is uniaxially oriented polyethylene (OPE), has two layers and is stacked so that orientation directions of the polymers are different from each other, and a second layer is polyamide (PA) and exists in the surface side.

Firstly, the OPE is obtained which is produced in a similar way to that in Exemplary Embodiment 2. Next, stacked body 1 obtained in Exemplary Embodiment 1 is cut out into a size of the width of 1 mm (W) and the length of 12 mm (L), and the both faces are sandwiched between the OPE films so that the stretching direction of the OPE forms 45 degrees with respect to the longitudinal direction. The both surfaces thereof are further sandwiched between further another OPE layers so that the stretching direction of the another OPE becomes 90 degrees with respect to the stretching direction of the OPE in the inner side, and the stacked body is pressurized and heated and fusion-bonded by a hot press (made by Tester Sangyo Co., Ltd.) at 130° C. and 0.5 kN. The actuator 4 is obtained in similar conditions to those in Exemplary Embodiment 1 except for the above description.

It can be confirmed that the two conductive layers sandwich the ion-conducting layer, by the observation of the cross section of the obtained actuator 4 with the use of a scanning electron microscope (SEM of S-4800 made by Hitachi High-Technologies Corporation). Furthermore, it can be confirmed that the whole in the surface side thereof is coated with two layers of the OPE, and the whole further in the surface side thereof is coated with the PA.

Comparative Example 1

A Method for Producing an Actuator 5 Having the First Layer of a Polymer Stacked on its Surface, which Suppresses the Permeation of Water An actuator 5 is produced as follows, of which the surface is coated with the first layer of the polymer that is high-density polyethylene HDPE. In other words, the actuator is produced so as to have a structure in which the high-density polyethylene HDPE is provided as an inner layer, and an outer layer is not provided.

In other words, the actuator 5 shall be a stacked body which is obtained in the steps before the coating of the second layer of PA in Exemplary Embodiment 1.

It is confirmed that two conductive layers sandwich an ion-conducting layer, and the whole in the surface side is coated with the HDPE, by the observation of the cross section of the obtained actuator 5 with the use of a scanning electron microscope (SEM of S-4800 made by Hitachi High-Technologies Corporation).

Comparative Example 2

A Method for Producing an Actuator 6 Having the First Layer of a Polymer that Suppresses the Permeation of Water, and Having the Second Layer of a Polymer that has a Lower Tensile Elastic Modulus than that of the First Layer, in which the Above Described First Layer is Stacked in the Further Surface Side than the Second Layer An actuator 6 is produced as follows in which the first layer of a polymer is high-density polyethylene HDPE, the second layer of a polymer is polyamide PA, and the first layer exists in the surface side and coats the whole actuator. In other words, the actuator is produced so as to have a structure in which the polyamide PA is provided as an inner layer, and the high-density polyethylene HDPE is provided as an outer layer.

Firstly, the stacked body 1 obtained in the above process is cut out into a size of a width of 1 mm (W) and a length of 12 mm (L), is dipped in a toluene solution containing 10 wt % PA, and is dried to be coated with the second layer. Next, both faces thereof are sandwiched between the HDPE films which are obtained in a similar way to that in Exemplary Embodiment 1, the films are pressurized and heated and fusion-bonded with the both faces by a hot press (made by Tester Sangyo Co., Ltd.) at 130° C. and 0.5 kN, the HDPE film protruded from the stacked body is cut off by a width of 1 mm, and the four surfaces of the stacked surface of the stacked body are pressed to a hot plate that has been overheated to 140° C., which promotes the fusion-bonding of the HDPE film in the thickness direction. Next, a hole through which a lead wire passes is formed so as to reach the surface of the conductive layer from the surface at a portion of 2 mm apart from an end, and the lead wire is bonded to the conductive layer with a conductive adhesive. After that, the actuator 6 is produced by heating the periphery of the lead wire at 140° C., melting a part of the HDPE and thereby blocking the hole of the HDPE.

It is confirmed that the two conductive layers sandwich the ion-conducting layer, the whole in the surface side is coated with the PA, and the whole in the further surface side is coated with the HDPE, by the observation of the cross section of the obtained actuator 6 with the use of a scanning electron microscope (SEM of S-4800 made by Hitachi High-Technologies Corporation).

Comparative Example 3

A Method for Producing an Actuator 7 Having the First Layer of a Polymer that Suppresses the Permeation of Water, and the Second Layer of a Polymer that has a Higher Tensile Elastic Modulus than that of the First Layer, in Which the Above Described Second Layer is Stacked in the Further Surface Side than the First Layer An actuator 7 is produced as follows in which the first layer of a polymer is high-density polyethylene HDPE, the second layer of a polymer is cast polypropylene CPP2, and the second layer exists in the surface side and coats the whole actuator. In other words, the actuator is produced so as to have a structure in which the high-density polyethylene HDPE is provided as an inner layer, and the cast polypropylene CPP2 is provided as an outer layer.

Specifically, the first layer of the HDPE has been stacked in Exemplary Embodiment 1, and then a cast polypropylene film with a thickness of 25 μm (CPP2 of F-300SP made by Prime Polymer Co., Ltd.) is stacked in a similar way to that for the HDPE. However, the temperatures of a hot press and a hot plate are set at 160° C. Next, a hole through which a lead wire passes is formed so as to reach the surface of the conductive layer from the surface at a portion of 2 mm apart from an end, and the lead wire is bonded to the conductive layer with a conductive adhesive. After that, the actuator 7 is produced by heating the periphery of the lead wire at 160° C., melting a part of the CPP2 and thereby blocking the hole of the CPP2.

Comparative Example 4

A Method for Producing an Actuator 8 Having the First Layer of a Metal that Suppresses the Permeation of Water, and Having the Second Layer of a Polymer, which is Stacked in the Further Surface Side than the First Layer An actuator 8 is produced as follows in which the first layer of the metal is aluminum, the second layer of the polymer is polyamide PA, and the second layer exists in the further surface side than the first layer and coats the whole actuator. In other words, the actuator is produced so as to have a structure in which aluminum (that is described as Al in Table 2) is provided as an inner layer, and the polyamide PA is provided as an outer layer.

Firstly, the stacked body 1 obtained in the above process is cut out into a size of a width of 1 mm (W) and a length of 12 mm (L), and aluminum is deposited on both surfaces thereof. Next, a lead wire is bonded to the conductive layer with a conductive adhesive on the surface at a portion of 2 mm apart from an end. The actuator 8 is obtained by dipping the resultant stacked body into a toluene solution containing 10 wt % PA and drying the raised stacked body to coat the surface with the second layer. It is confirmed that the two conductive layers sandwich the ion-conducting layer, the both surfaces are coated with aluminum, and the whole in the surface side is coated with HDPE, by the observation of the cross section of the obtained actuator 8 with the use of a scanning electron microscope (SEM of S-4800 made by Hitachi High-Technologies Corporation).

<Evaluation for Tensile Elastic Modulus>

The tensile elastic modulus is expressed by the value (Young's modulus) of a gradient $\delta/\epsilon$, which is calculated by obtaining a stress ($\delta$)-strain ($\epsilon$) curve for each film of the first layer and the second layer which are used for a polymer actuator, with the use of a tensile tester (MST-1 made by Shimadzu Corporation).

The tensile elastic modulus is calculated for each single film of HDPE, CPP1 and OPE which are used for the first layer of a polymer, and PA which is used for the second layer, with the above described method. The results are shown in Table 1. Here, the OPE is measured in the same tensile direction as the stretching direction.

TABLE 1

|  | First layer | | | Second layer | |
| --- | --- | --- | --- | --- | --- |
|  | HDPE | CPP1 | OPE | PA | CPP2 |
| Tensile elastic modulus (MPa) | 1000 | 630 | 1500 | 80 | 2200 |

In Exemplary Embodiments 1, 2, 3 and 4 and Comparative Example 2, the tensile elastic modulus of the second layer is smaller than that of the first layer. The tensile elastic modulus of the HDPE of the second layer in Comparative Example 2 is larger than that of the PA of the first layer.

The tensile elastic modulus of the CPP2 which is used for the second layer in Comparative Example 3 is 2,200 MPa, and the tensile elastic modulus of the second layer is larger than that of the first layer.

<Evaluation of Durability>

The durability of the actuator shown when the actuator has been driven for many hours is evaluated by the variance of the displacement magnitude. Specifically, one end of the actuator is fixed in an atmosphere with a humidity of 90% RH, the voltage of 2.5 V is applied to the actuator, and the actuator is bent. The durability is evaluated from a result obtained by measuring the displacement magnitude after the actuator has been bent a predetermined number of times, at a position of 8 mm apart from the fixed end with the use of a laser displacement meter (LK-G80 made by Keyence Corporation).

The durability is evaluated with the operation of measuring the displacement magnitude at the position of 8 mm apart from the fixed end on the actuators 1 to 8 in Exemplary Embodiments 1 to 4 and Comparative Examples 1 to 4, which have been continuously driven for 3,000 times, 6,000 times and 10,000 times in the atmosphere with a humidity of 90% RH, with the laser displacement meter. The result is shown in Table 2.

TABLE 2

| | Exemplary Embodiment 1 | Exemplary Embodiment 2 | Exemplary Embodiment 3 | Exemplary Embodiment 4 | Comparative Example 1 | Comparative Example 2 | Comparative Example 3 | Comparative Example 4 |
|---|---|---|---|---|---|---|---|---|
| Inner layer | HDPE | CPP1 | OPE | OPE2 | HDPE | PA | HDPE | Al |
| Surface layer | PA | PA | PA | PA | None | HDPE | CPP2 | PA |
| Displacement magnitude (mm) | | | | | | | | |
| Drive number of times | | | | | | | | |
| 3000 | 2.2 | 2.3 | 2.1 | 2.0 | 2.2 | 2.2 | 1.8 | 2.0 |
| 6000 | 2.2 | 2.3 | 2.1 | 2.0 | 1.6 | 1.7 | 1.2 | 1.4 |
| 10000 | 2.0 | 2.1 | 2.1 | 2.0 | 0.8 | 0.9 | 0.5 | 0.3 |

In the actuators of Exemplary Embodiments 1 to 4, the displacement magnitudes do not vary even when a drive number of times is 3,000 times and 6,000 times, and are 2.2, 2.3, 2.1 and 2.0 (mm) in Exemplary Embodiments 1, 2, 3 and 4, respectively.

In the actuators of Comparative Examples 1 to 4, any of the displacement magnitudes decreases when the drive number increases from 3,000 times to 6,000 times. The displacement magnitudes when the drive number of times is 3,000 times are 2.2, 2.2, 1.8 and 2.0 (mm) in Comparative Examples 1, 2, 3 and 4, respectively, whereas the displacement magnitudes when the drive number of times is 6,000 times are 1.6, 1.7, 1.2 and 1.4 (mm) in Comparative Examples 1, 2, 3 and 4, respectively.

Furthermore, when the drive number of times is 10,000 times, the displacement magnitudes of the actuators obtained in Exemplary Embodiments 3 and 4 do not vary as they are 2.1 and 2.0 (mm), respectively. The displacement magnitudes of the actuators obtained in Exemplary Embodiments 1 and 2 do not almost vary as they are 2.0 and 2.1 (mm), respectively. On the other hand, in the actuators obtained in Comparative Examples 1, 2, 3 and 4, the displacement magnitudes further decrease, and become 0.8, 0.9, 0.5 and 0.3, respectively.

In addition, each of the actuators which have been driven for 10,000 times is visually observed. As a result, in the actuators obtained in Exemplary Embodiments 1, 2, 3 and 4, the appearance does not change compared to that of the actuator which is not yet driven, and neither of cracking and deterioration is observed. On the other hand, in the actuators obtained in Comparative Examples 1, 2 and 3, cracking and deterioration are observed in a part of a layer which covers the conductive layer and the ion-conducting layer, and peeling is observed in a part of the covering layer. In addition, in the actuator obtained in Comparative Example 4, peeling is observed in a part of the covering layer.

In addition, in the actuators obtained in Comparative Examples 1, 2, 3 and 4, the exudation of the ionic liquid is observed in a part after the actuators have been driven for 10,000 times, but in the actuators obtained in Exemplary Embodiments 1, 2, 3 and 4, the exudation is not observed.

The actuator of the present invention suppresses the inflow of water and the like and is unlikely to cause cracking and peeling even when repeatedly driven, and the movement is unlikely to be disturbed. Accordingly, the actuator can be used in a device such as a robot and micromachine which can be used for a long period of time in various environments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-197417, filed Aug. 27, 2009, and Japanese Patent Application No. 2010-089852, filed Apr. 8, 2010 which are hereby incorporated by reference herein in their entirety.

What is claimed is:

1. An actuator having a conductive layer and an ion-conducting layer comprising: a first layer which is provided in contact with the actuator and is formed from a polymer that suppresses the permeation of water; and a second layer which is provided in contact with the first layer, has a lower tensile elastic modulus than that of the first layer, protects the first layer, and is formed from a polymer.

2. The actuator according to claim 1, wherein the first layer and the second layer cover the whole actuator.

3. The actuator according to claim 1, wherein the polymer of the first layer is oriented, and the orientation direction of the polymer is the same as the movement direction of the actuator, which is projected on the surface of the first layer.

4. The actuator according to claim 1, wherein the first layer comprises at least two layers, and the orientation directions of the polymers of the first layer comprising the at least two layers are different from each other.

5. The actuator according to claim 1, wherein the actuator contains an ionic liquid.

6. The actuator according to claim 1, wherein the conductive layer contains a carbon material.

7. The actuator according to claim 1, wherein the conductive layer has at least one of a polymer fiber and a porous component.

8. The actuator according to claim 1, wherein the ion-conducting layer has at least one of the polymer fiber and the porous component.

* * * * *